(No Model.)
J. WHERRY, Jr.
CULTIVATOR.
No. 311,931. Patented Feb. 10, 1885.
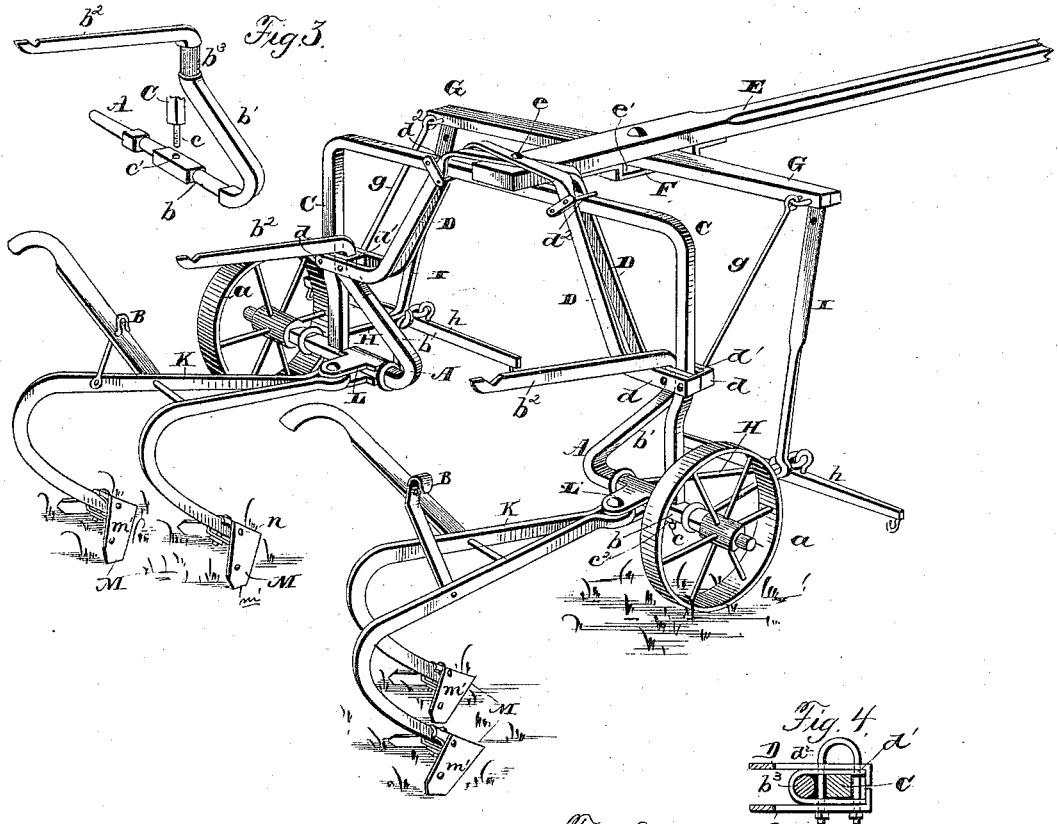
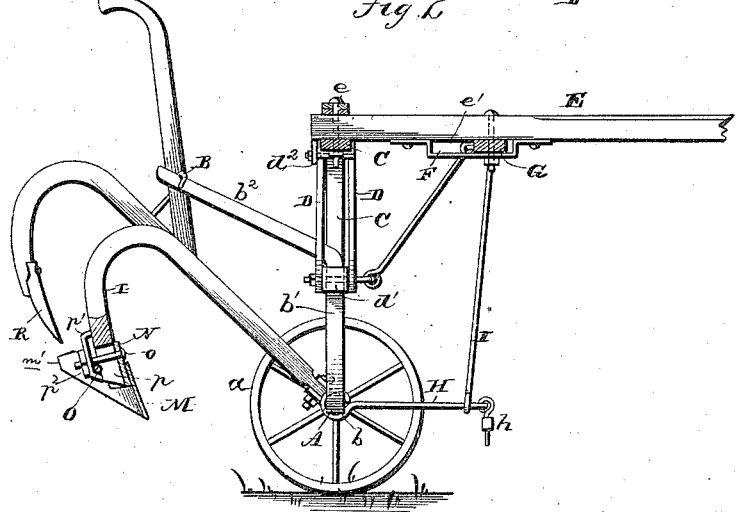
WITNESSES
Geo. F. Downing
S. G. Nottingham
INVENTOR
John Wherry Jr.
B. H. A. Symmons
ATTORNEY

UNITED STATES PATENT OFFICE.

JOHN WHERRY, JR., OF PUTNAM, ILLINOIS.

CULTIVATOR.

SPECIFICATION forming part of Letters Patent No. 311,931, dated February 10, 1885.

Application filed October 4, 1884. (No model.)

*To all whom it may concern:*

Be it known that I, JOHN WHERRY, Jr., of Putnam, in the county of Putnam and State of Illinois, have invented certain new and useful Improvements in Cultivators; and I do hereby declare the following to be a full, clear, and exact description of the invention, such as will enable others skilled in the art to which it appertains to make and use the same.

My invention relates to an improvement in cultivators, the object of the same being to provide a cultivator which can be more easily and expeditiously operated than those hitherto constructed; a further object being to provide a perfect equalization of draft and a lighter draft; a further object being to prevent any side-jerking of the tongue; a further object being to provide a tooth or shovel which will stir the soil at a uniform depth, and which will not cut the roots of growing corn by running too deep or creeping too near the same beneath the soil and unobserved.

With these ends in view my invention consists in certain features of construction and combinations of parts, as will be hereinafter described, and pointed out in the claims.

In the accompanying drawings, Figure 1 is a view of the cultivator in perspective. Fig. 2 is a longitudinal vertical section with the cultivator in an elevated position. Fig. 3 is a detached view of one of the axles; and Fig. 4 is a detached view of the clip or yoke for securing the axle to the arch.

A A represent the axles, on the outer ends of which the wheels $a$ are loosely mounted. Each axle is bent or cast to form three sections extending in different directions. The lower section, $b$, on which the wheel $a$ is mounted, is horizontal. The middle section, $b'$, extends from the inner end of $b$ upwardly and outwardly in an oblique direction to a point above the section $b$ just inside of the wheel-hub, and the section $b^2$ extends from the upper end of $b'$ upwardly and rearwardly, the outer end being notched or hook-shaped to receive a hook, B, secured to the cultivator handle or beam, by means of which the cultivators are held in an elevated position for turning, &c.

Between the sections $b'$ and $b^2$ there is a short vertical rounded portion, $b^3$, which serves as a wrist or pivot to admit of a horizontally-rocking motion, as will appear further on. The arch C extends downwardly on either side just outside of the wrist $b^3$, and bends inwardly below it resting on the axle at a point directly beneath it. The end of C is provided with a round tenon, $c$, which passes through a socket, $c'$, in the axle and is locked therein by a nut or pin, $c^2$, engaging its end below the axle. A pair of braces or a single brace, preferably a pair, D, cross each other above the center of the arch C, and extending diagonally downwardly and outwardly on either side of the arch terminate in a horizontal portion, $d$, on the front and rear sides of the arch and axle at the wrist portion $b^3$. A clip, strap, or yoke, $d'$, passes about the wrist $b^3$ and the arch C within the ends of the braces D, and the clip, braces, and arch are bolted rigidly together. The axle-bar A is shouldered above and below the portion $b^3$, and the bight of the clip $d'$ forms a bearing, in which the wrist rotates, as before noted. The braces D are secured to the top of the arch C by clips or bolts $d^2$. The rear end of the tongue E is pivotally secured between the top of the arch C and the braces D by a bolt, $e$. A plate, F, is secured to the under side of the tongue a short distance in front of the pivotal bolt $e$, and bent to form an elongated recess, $e'$, between itself and the tongue, in which recess a cross-bar, G, is pivotally secured. The ends of the bar G are connected with the arch C and braces D at the point where they are secured together about the wrist $b^3$ by stay-rods $g$, the connections being such as to allow the bar horizontal play. Draft-rods H are secured to the section $b$ of the axle at points just inside of the wheel and at the inner ends of the sections, said draft-rods approaching each other as they extend forwardly and terminating in a loop or hook convenient for attaching a single-tree, $h$, thereto. Upright supports I are attached to the draft-rods H near their outer ends by a loose joint, their upper ends being secured in vertical adjustment to the ends of the bar G, by which adjustment the point of draft is elevated or depressed at pleasure. The cultivator-beam K is pivotally secured between the upper and lower branches of the piece L, which latter loosely embraces the axle-section $b$ between the inner draft-rod and the end of the arch. By this connection the cultivator is allowed both a lateral and vertical swinging motion.

From the above construction it will be observed that either cultivator-section may be advanced independently of the other, thus effectually remedying the unequal draft caused by a lagging or unwilling horse, and when the cultivator is hooked up on the sections $b^2$ the driver may guide the wheels into position between the rows by taking hold of the cultivator-handles, since the axle A has a horizontal rocking motion on the two pivotal bearings—viz., the tenon $c$ and the wrist $b^3$—located in the same vertical line. Furthermore, the tongue is not affected by the jerky motion of either cultivator-section, as the bar G is pivoted in such a manner to the tongue that either end will yield without drawing the tongue to one side. This is an important advantage, as the lateral jerky motion of the tongue is liable to bruise the necks of horses. In short, the cultivator as thus constructed combines all the advantages of the tongue and tongueless cultivators without any of their disadvantages.

M is my improved cultivator-shovel. It consists of a sheet of steel bent or pressed to form two shares, $m$, standing nearly at right angles to each other. The rear end of each share is preferably cut away, as shown at $m'$, to prevent the corner of the share from running under the plant and destroying it unobserved by the operator.

The shovel is provided with four perforations, $n$. The two middle or front ones are used to bolt or rivet an upwardly-projecting piece, N, snugly thereto, and the outer ones to bolt or rivet a brace, O, rigidly thereto.

The standard P, to which the shovel M is secured, is bifurcated at its lower end or provided with an elongated slot, $p$. A bolt, $o$, extends through a perforation in the piece N and the slot $p$. A clamping-plate, $p'$, adapted to partially embrace the brace O, fits on the end of the bolt $o$, and a draw-nut, $p^2$, binds the piece N and brace O snugly to the standard, and thereby holds the shovel M firmly in the desired vertical adjustment.

I find it desirable to provide each cultivator-section with one of my improved shovels and one of the ordinary style, (represented at R, Fig. 2,) the shovel M being run next to the plant the first and last times. It cuts more surface than the ordinary tooth, destroys more weeds, stirs the soil at a uniform depth, and runs very much easier.

It is evident that slight changes may be made in the form and arrangement of the several parts without departing from the spirit and scope of my invention; hence I do not wish to limit myself strictly to the construction herein set forth; but, Having fully described my invention, what I claim as new, and desire to secure by Letters Patent, is—

1. In a cultivator, the combination, with the arch, of supporting-wheel axles pivotally secured to the arch, said axles having rearwardly-extending portions adapted to form supports for the cultivator-sections when the same are elevated, and a cultivator-section secured to each axle, substantially as set forth.

2. In a cultivator, the combination, with the arch, and axles pivotally secured on the ends of the arch, said axles extending obliquely upward, and having wrists formed thereon directly above the pivots at the ends of the arch, of clips adapted to form bearings for the wrists and secure the upper portions of the axles to the arch, substantially as set forth.

3. In a cultivator, the combination, with the arch and axles, each axle pivotally secured to the arch by a lower and an upper bearing, of a brace rigidly secured to the arch at the two said upper bearings and at the top of the arch, substantially as set forth.

4. In a cultivator, the combination, with the arch, axles pivotally secured thereto, the tongue pivotally secured to the top of the arch, cultivators secured to the axle, and the cross-bar pivotally secured to the tongue, of stay-rods and supporting-rods attached to the ends of the cross-bar and arch and axles by loose connections, whereby either section of the cultivator may be advanced without affecting the tongue, substantially as set forth 5. In a cultivator, the combination, with the arch having the supporting-axles pivoted thereto, draft-rods and cultivator-sections secured to the axles, and a tongue pivoted to the arch, of a cross-bar pivoted to the tongue, and supporting-rods attached to the ends of the cross-bar and the draft-rods by loose connections, whereby either cultivator may be advanced without increasing or diminishing the draft on the other, substantially as set forth.

6. The combination, with the axles pivotally secured to the arch, and provided with rearwardly-extending sections, of cultivator-sections pivotally secured to the axles, and provided with hooks whereby the cultivator-sections may be locked to the said axle-sections in elevated adjustment, substantially as set forth.

7. The combination, with the axles pivotally secured to the arch, and provided with rearwardly-extending sections, of cultivator-sections pivotally secured to the axles, and hooks attached to the cultivator-handles, whereby the cultivator-sections may be locked in the said axle-sections in position to be steered into position by the driver, substantially as set forth.

8. The combination, with a cultivator-beam terminating in a slotted standard, of a sheet-steel double-share tooth provided with a front perforated projection and a rear cross-brace, a bolt adapted to pass through the said projection and slotted standard, a clamp adapted to engage the brace at the rear of the standard, and a nut for locking the projection and clamp snugly to the standard, substantially as set forth.

In testimony whereof I have signed this specification in the presence of two subscribing witnesses.

JOHN WHERRY, JR.

Witnesses:
WM. L. KELSO,
GEORGE LONGMAN, Jr.